G. STEVENSON.
REVOLVING CULTIVATORS.

No. 186,634. Patented Jan. 23, 1877.

UNITED STATES PATENT OFFICE.

GEORGE STEVENSON, OF ZIONSVILLE, INDIANA.

IMPROVEMENT IN REVOLVING CULTIVATORS.

Specification forming part of Letters Patent No. 186,634, dated January 23, 1877; application filed December 11, 1876.

*To all whom it may concern:*

Be it known that I, GEORGE STEVENSON, of Zionsville, in the county of Boone and State of Indiana, have invented certain new and useful Improvements in Revolving Cultivators; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My invention relates to that class of earth-pulverizers in which one or more series of revolving-star wheels are placed and rotate upon one or more shafts or axles when the machine moves forward; and the nature of my invention consists in the construction and arrangement of such star-wheels, having side cutters placed at an angle of about forty-five degrees to the arms upon which they are formed, as will be hereinafter more fully set forth.

Figure 1:
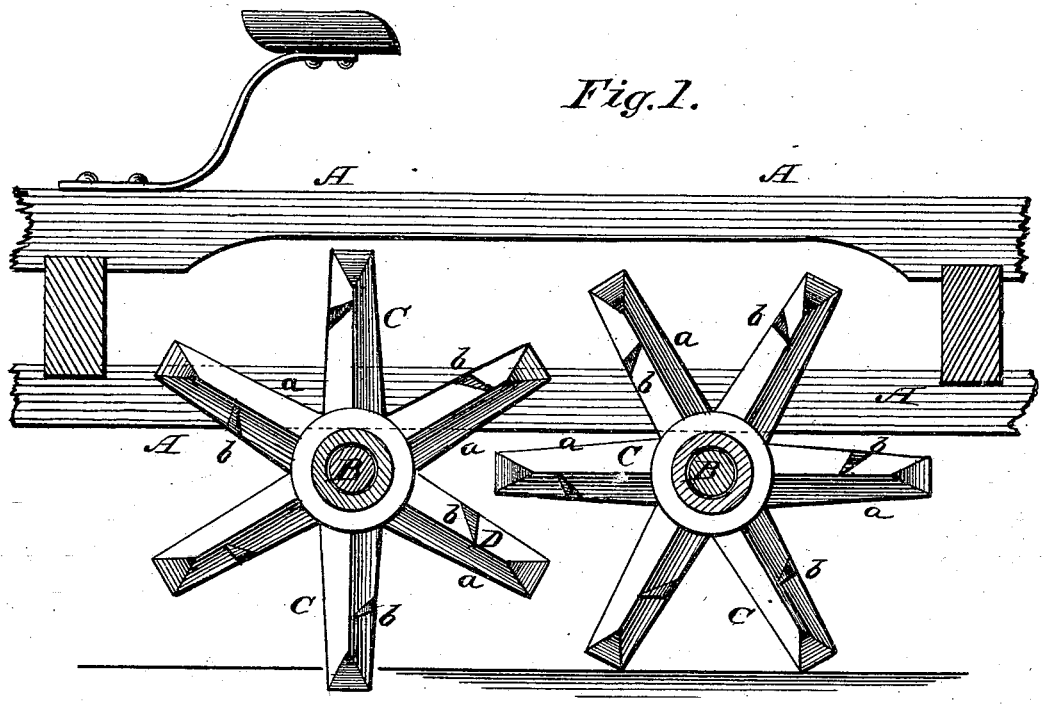
Figure 2:
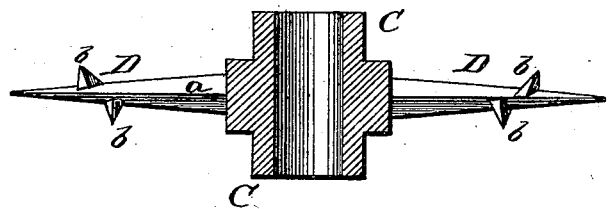

In the annexed drawing, Figure 1 is a vertical section of an earth-pulverizer embodying my invention, and Fig. 2 is a section of one of the star-wheels.

A represents a suitable frame-work in which are mounted two parallel shafts or axles, B B, upon each of which is mounted a series of wheels, C. These wheels are made in star form, and the front of each blade is formed with a straight sharp cutting-edge, $a$, so as to cut any obstruction that it may come in contact with, such as corn-stalks, weeds, grass, &c., while it is made to revolve by the forward movement of the cultivator or pulverizer. On the sides of the blades of each wheel C are formed side cutters D D, which are set at a certain angle of about forty-five degrees to the blade, so that their cutting-edges $b$ will strike the earth or other substance in a cutting position and cut any substance that it may come in contact with. These side cutters being set at an angle and in circular form will assist in drawing the cultivator deeper into the soil by its rotating motion than it otherwise would; and no obstructions will hang or clog to said side cutter, as they cut their way into the soil and out again. One or more series of these wheels are used, and when two or more shafts with wheels are in one machine, the wheels should be set so that those on one shaft will work between those on the other shaft, and thus one set of wheels cleans the other of all obstructions. On one side of the wheel the inclined side cutters D are at the same distance from the ends of the arms, while on the other side the cutters are at varying distances from the ends of the arms, as shown in the drawing.

I make no claim to any invention shown in patents to Lefeber & Shults, October 31, 1871, and W. J. Atchison, December 5, 1876; but

Having thus fully described my invention, what I claim as new, and desire to secure by Letters Patent, is—

In a revolving cultivator or earth-pulverizer the star-wheel C, having each of its arms provided with straight cutting-edge $a$, and inclined side cutters D D, set at an angle of about forty-five degrees, and in circular form, substantially as and for the purposes herein set forth.

In testimony that I claim the foregoing as my own I affix my signature in presence of two witnesses.

GEORGE STEVENSON.

Witnesses:
    JAMES M. SHULTZ,
    JNO. A. PERRILL.